April 16, 1940.                B. R. BENJAMIN                2,197,424
                                TILLING IMPLEMENT
                               Filed Jan. 19, 1939
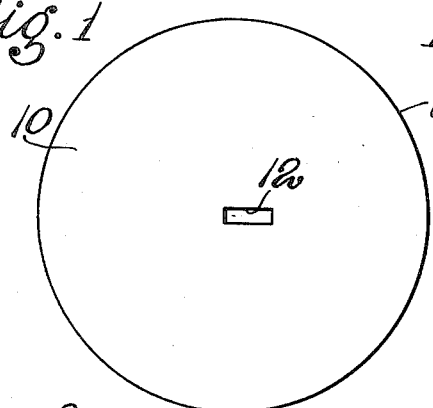
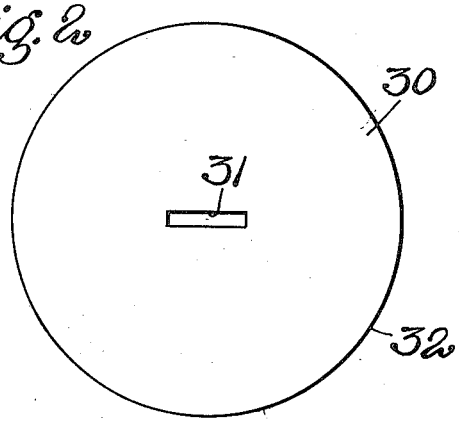
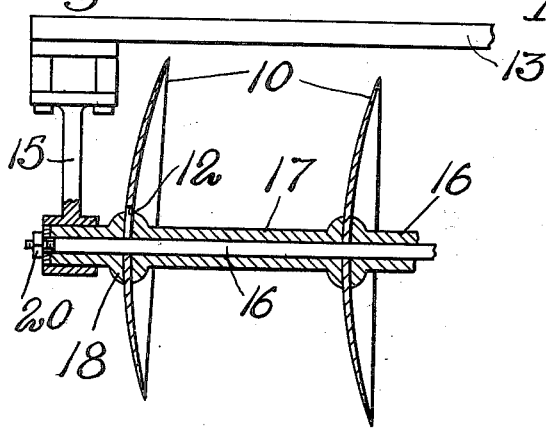
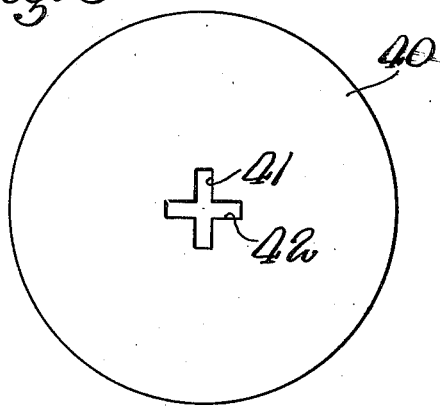
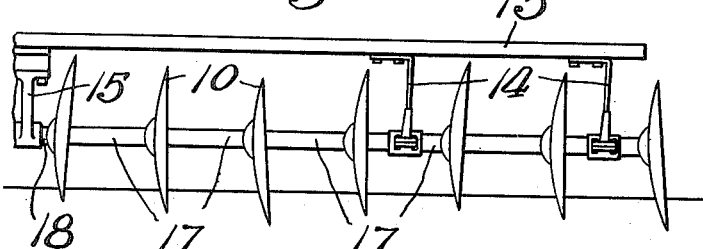
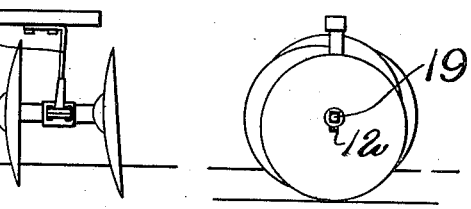
Inventor
Bert R. Benjamin
By V. F. Lassagne
Atty.

Patented Apr. 16, 1940

2,197,424

UNITED STATES PATENT OFFICE 2,197,424

TILLING IMPLEMENT

Bert R. Benjamin, Oak Park, Ill., assignor to International Harvester Company, a corporation of New Jersey Application January 19, 1939, Serial No. 251,767

19 Claims. (Cl. 97—220)

This invention relates to a tilling implement and more particularly to a tilling implement of the pit plowing or basin forming type. Still more particularly, the invention relates to improved tilling elements for use in the implement.

The invention contemplates an improvement in the tilling implement forming the subject of applicant's Patent 2,136,607, granted November 15, 1938, on an application filed December 24, 1936.

As clearly disclosed in the aforesaid patent, the invention therein provides a tilling implement comprising a plurality of tilling elements adapted for pit plowing or basin forming operations with an additional feature provided in means for mounting the elements in the gang constituting the implement in a manner permitting the same elements to be utilized in ordinary disk plowing. Specifically, each tilling element is in the form of a disk having a plurality of openings formed therein, one of which is located centrally of the disk and another of which is located eccentrically, the eccentric openings being utilized for mounting the disks on the shaft during pit plowing or basin forming operations, and the central openings being utilized when the disks are mounted on the shaft for ordinary disk plowing.

The present invention has for its principal object the provision of tilling elements similar to those disclosed in the aforesaid patent, each element herein being provided with means for adapting it to be positionable on the shaft either concentrically or eccentrically with respect to the shaft without disassembling the gang comprising the tilling implement.

An important object is to provide a disk with a slot or slots formed therein at desirable locations for enabling the disk to be positioned at various points with respect to the shaft without removing the same therefrom.

Another important object is to provide various types of slots for achieving the aforesaid object in a number of forms.

Briefly and specifically, these and other desirable objects are achieved in a preferred form of the invention in which a tilling implement comprises a gang including a frame member supporting a shaft carrying a plurality of tilling elements and spacing spools, each element being in the form of a disk provided, in one instance, with a slot extending from its center radially toward its periphery. The shaft is square in cross section and the slots fit thereon for rotation of the disks therewith, the disks being additionally held by the clamping action of the spacing spools as the clamping nut at the end of the gang is tightened, it being well known to those skilled in the art that the mounting shaft extends through the entire number of disks and spools. Because of the slotted opening in each element or disk, the disk may be positioned with respect to the shaft so that portions of the peripheral cutting edge are spaced at various distances from the center of the shaft, and the disks may be alternately or otherwise arranged on the shaft to obtain a desirable result in a pit plowing or basin forming operation. The slots also permit the disks or elements to be positioned on the shaft at their true centers whereby the tilling implement may be utilized as a disk plow.

A further understanding of the objects and desirable features of the invention may be had from the following detailed description taken in conjunction with the accompanying sheet of drawing in which:

Figures 1, 2 and 3 illustrate improved disks, each figure showing a disk having a desirable form of slot therein for mounting the same on the shaft of the implement;

Figure 4 is a transverse sectional view of an end portion of the implement gang, showing the relation between a pair of disks, the shaft and the spacing spools;

Figure 5 is an elevational view of the gang, showing a plurality of disks arranged thereon in preferred positions for pit plowing or basin forming operations; and, Figure 6 is an end elevational view of the arrangement shown in Figure 5.

Figure 1 illustrates a preferred form of tilling element in the form of a substantially circular disk 10 having a peripheral cutting edge 11, and formed with a slot 12. The slot 12 is preferably formed on a diameter of the disk and extends from the center of the disk radially toward the periphery of the disk. Thus substantially diametrically opposed, proximal and distal cutting edges are formed by the periphery of the disk, the proximal edge lying nearer to and the distal edge farther from the eccentric portion of the slot. It will be understood that only a preferred form of disk is shown, but it will be appreciated that various forms of disks or other elements may be utilized which may have variously shaped cutting edges substituted for the peripheral cutting edge 11. The improved mounting means provided by the invention may well be used with such forms of disks without sacrificing the spirit and desirable features of the invention.

As best shown in Figures 4 and 5, the disks 10 are adapted for utilization as a gang in a tilling implement as shown, only a sufficient portion of such implement being illustrated as is necessary to disclose the invention. In a conventional type of implement there is included a support or bar 13 which, through the medium of depending brackets 14 and 15, carries a long shaft 16 provided with the disks 10 and a plurality of spacing spools 17. The shaft 16 is preferably square in cross section and extends axially beyond the outer end of the end support 15. Each disk is carried on the shaft 16 through the medium of a slot 12 with a spacing spool 17 surrounding the shaft intermediate each pair of disks, a short end spool 18 being journaled in the support 15. The shaft is headed or provided with a nut at one end, as at 19, as shown in Figure 6, and at its other end passes through the end spool 18 in the support 15, and is provided with a threaded portion carrying a clamping nut 20. When the nut 20 is tightened, the disks 10 are retained in desired positions through the clamping action of the spacing spools 17, the spools in conjunction with the slots 12 providing mounting means for the disks which enables the disks to rotate with the shaft as a unit.

As best shown in Figure 5, the disks 10 may be positioned on the shaft at various points with respect to each other and to the shaft, this being accomplished by sliding each disk with respect to the shaft through its slot 12. In a desirable arrangement of the disks on the shaft, the left hand disk, as shown in Figures 4 and 5, is mounted on the shaft with its greater portion above the shaft; that is, the shaft 16 engages the lower portion of the slot 12 as disposed in a vertical position. The next disk from the left is mounted on the shaft with its slot 12 in a horizontal position and is arranged thereon with its greater portion forwardly of the shaft; that is, the shaft 16 engages the rearward portion of the slot 12 in that disk. The next disk is arranged on the shaft with its greater portion below the shaft, the position of this disk being reversed from the position of the first disk. The next disk is positioned on the shaft with its greater portion rearwardly of the shaft, or in a position reversed from that of the second disk. The next disk is arranged on the shaft in the same position as is the first disk, and adjacent disks respectively correspond in position to those disks previously described. It will be understood that the arrangement of the disks on the shaft is arbitrary, depending upon the results desired, and a greater or lesser number of disks may be used. It has been found desirable in some sections, depending on soil conditions and the like, to mount alternate disks concentrically on the shaft; that is, with the centrally located part of the slot fitting the shaft. The preferred arrangement described in connection with the illustration of Figure 5 is clearly shown in Figure 6. From these two figures it will be seen that, at various stages of rotation of the disks and shaft as a unit, the disks engage and cut the ground at various depths, and, since the gang is drawn over the field at an angle with respect to the line of draft, the disks cut furrows or pits of varying widths and depths. The operation of the gang and disks is clearly disclosed in applicant's patent previously referred to.

When it becomes desirable to operate the implement as an ordinary disk gang plow, the disks are returned to central positions on the shaft 16. This is acomplished by loosening the nut 20 a sufficient number of turns to release the clamping action of the spools 17, which, in turn, permits the disks 10 to be easily moved thru the extent of their slots to central position. Thus it will be seen that the disks are readily and easily positionable with respect to the shaft and with respect to each other without disassembling the unit or gang.

Another preferred form of tilling element is illustrated in Figure 2 and takes the form of a substantially circular disk 30 having a slot 31 formed therein, lying substantially on a diameter of the disk. The disk 30 is provided with a peripheral cutting edge 32 smilar to the cutting edge 11 on the disk 10, but it will be understood that this edge may be varied as desired, as mentioned in connection with the description of the disk 10. The slot 31 in the disk 30 includes the center of the disk and extends to points at opposite sides thereof and increases the number of positions in which the disk may be mounted on the shaft 16. It will be understood that the use of this disk in the gang is substantially identical to the use of the disk 10 as previously described.

The tilling element illustrated in Figure 3 is similar in form to the disks 10 and 30 and takes the form of a disk 40 formed with slots 41 and 42, which preferably intersect on diameters of the disk which intersect at right angles. The provision of the intersecting slots 41 and 42 adapts the disk 40 to be mounted on the shaft 16 in a plurality of positions with respect thereto and with respect to other similar disks. The disks 10, 30 and 40 may be utilized together in the same gang, or each may be utilized with others of its kind.

The location of the slots in the disks has been followed with the general principle in mind of providing means for mounting the disks on a shaft in a manner permitting the disks to be disposed in various positions on the shaft with respect to the shaft and with respect to each other, a matter of prime importance being the provision of a slot which includes a substantially central portion of the disk and which extends toward or away from a cutting edge.

Only a few preferred forms of the present invention have been disclosed as illustrative of an improved disk which is positionable on the implement shaft without removal therefrom, and it will be appreciated that numerous other forms and shapes may be designed without departing from the spirit and scope of the invention as defined in the appended claims.

What is claimed is:

1. In a tilling implement, a gang comprising a shaft and a plurality of tilling elements mounted on the shaft for rotation therewith as a unit, each element comprising substantially a disk and having means therein permitting slidable positioning thereof substantially radially with respect to the shaft.

2. In a tilling implement, a gang comprising a shaft and a plurality of tilling elements mounted on the shaft for rotation therewith as a unit, each element comprising substantially a disk and having formed therein an opening through which the shaft is passed, said opening being elongated substantially radially of the element to permit radial positioning of the element on the shaft.

3. In a tilling implement, a gang comprising a shaft and a plurality of disks mounted on the shaft for rotation therewith as a unit, each of said disks being mounted on the shaft at a point spaced from the true center of the disk, and means associated with each disk and the shaft for positioning each disk on the shaft at its true center while said disk remains on the shaft.

4. In a tilling implement comprising a shaft and a plurality of tilling elements mounted on the shaft for rotation therewith as a unit, each element including an arcuate cutting edge, each element being formed with an eccentric slot serving to mount the element positionably on the shaft.

5. A disk adapted to be mounted on a shaft and formed with a slot of generally uniform width therein extending substantially radially of the disk from and including substantially the center of the disk.

6. A disk adapted to be mounted on a shaft and formed with a slot of generally uniform width therein including substantially the center of the disk and extending to points at each side of said center.

7. A disk adapted to be mounted on a shaft and formed with a pair of slots intersecting on a pair of intersecting diameters of the disk, each slot being of generally uniform width throughout, and the widths of the slots being substantially equal.

8. A disk adapted to be mounted on a shaft and formed with a pair of adjustment slots intersecting on a pair of diameters of the disk which intersect at right angles.

9. A tilling element adapted to be mounted on a shaft and having a cutting edge formed about a center, said element having a slot of substantially uniform width therein including and extending substantially from the center toward the cutting edge.

10. A tilling element having diametrically opposed, substantially circular cutting edges formed about a common center, said element being formed with an eccentric adjustment slot.

11. A disk adapted to be mounted on a shaft and formed with an eccentric adjustment slot.

12. A disk adapted to be mounted on a shaft and formed with an adjustment slot therein lying substantially along a diameter of the disk.

13. A disk adapted to be mounted on a shaft and formed with a pair of adjustment slots therein meeting substantially at a right angle at substantially the center of the disk.

14. A tilling element adapted to be mounted on a shaft and having a cutting edge formed about a center, said element having an adjustment slot therein extending substantially from the center away from the cutting edge.

15. A tilling element adapted to be mounted on a shaft and having a cutting edge formed about a center, said element having an adjustment slot extending from a point nearer the cutting edge to a point farther from the cutting edge.

16. A tilling element adapted to be mounted on a shaft and having a pair of substantially diametrically opposed cutting edges formed about a center, said element having an adjustment slot in its central portion extending in a direction from one cutting edge toward the other cutting edge.

17. In a tilling implement having a mounting shaft formed with opposite parallel sides and substantially rectangular in cross-section, the combination with said shaft of a tilling element having an arcuate cutting edge and formed with an elongated slot having opposite sides cooperating with the aforesaid sides of the shaft for mounting the element on the shaft for rotation therewith, said slot being of a sufficient length greater than the cross section of the shaft to permit slidable positioning of the element with respect to the shaft, and means for clamping the element rigid with respect to the shaft in any position within the extent of the slot.

18. In a tilling implement having a mounting shaft formed with opposite parallel sides, the combination with said shaft of a tilling element having an arcuate cutting edge and formed with an elongated slot having opposite sides cooperating with the aforesaid sides of the shaft for mounting the element on the shaft for rotation therewith, said slot being of a sufficient length to permit slidable positioning of the element with respect to the shaft, and means for clamping the element rigid with respect to the shaft in any position within the extent of the slot.

19. A disk adapted to be mounted on a shaft and formed with an adjustment slot substantially at its center.

BERT R. BENJAMIN.